US009973990B2

(12) United States Patent
Park et al.

(10) Patent No.: US 9,973,990 B2
(45) Date of Patent: May 15, 2018

(54) METHOD AND APPARATUS FOR TRANSMITTING HANDOVER REPORT MESSAGE IN WIRELESS COMMUNICATION SYSTEM

(71) Applicant: LG Electronics Inc., Seoul (KR)

(72) Inventors: Kyung Min Park, Gyeonggi-do (KR); Dae Wook Byun, Gyeonggi-do (KR); Jin Sook Ryu, Gyeonggi-do (KR); Jian Xu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 460 days.

(21) Appl. No.: 14/368,574

(22) PCT Filed: Jan. 28, 2013

(86) PCT No.: PCT/KR2013/000665
§ 371 (c)(1),
(2) Date: Jun. 25, 2014

(87) PCT Pub. No.: WO2013/115532
PCT Pub. Date: Aug. 8, 2013

(65) Prior Publication Data
US 2014/0376363 A1    Dec. 25, 2014

Related U.S. Application Data

(60) Provisional application No. 61/592,004, filed on Jan. 30, 2012, provisional application No. 61/592,561, filed on Jan. 30, 2012.

(51) Int. Cl.
*H04W 36/00*    (2009.01)
*H04W 36/16*    (2009.01)
(Continued)

(52) U.S. Cl.
CPC ....... *H04W 36/165* (2013.01); *H04L 41/0668* (2013.01); *H04W 24/04* (2013.01);
(Continued)

(58) Field of Classification Search
None
See application file for complete search history.

(56) References Cited

U.S. PATENT DOCUMENTS 9,282,494 B2 *  3/2016  Folke
2002/0183927 A1 * 12/2002  Odamura ............... G01C 21/20
                                                                 701/455
(Continued)

OTHER PUBLICATIONS

Li et al., "Personal Communication Systems (PCS)," Proceedings of the IEEE, 83: 1210-1243 (1995).
(Continued)

*Primary Examiner* — Alex Skripnikov
(74) *Attorney, Agent, or Firm* — Morgan, Lewis & Bockius LLP (57) ABSTRACT

A method and apparatus for transmitting a handover report message in a wireless communication system is provided. In a heterogeneous network (HetNet) intra long term evolution (LTE) failure case, an eNodeB (eNB) performs a handover procedure for a user equipment (UE) with a source eNB, and receives a radio link failure (RLF) indication message. The eNB transmits a handover report message to the source eNB, the handover report message including UE history information element (IE) of the UE.

12 Claims, 9 Drawing Sheets

(51) Int. Cl.
*H04L 12/24* (2006.01)
*H04W 36/38* (2009.01)
*H04W 24/04* (2009.01)
*H04W 36/08* (2009.01)

(52) U.S. Cl.
CPC ... *H04W 36/0005* (2013.01); *H04W 36/0055* (2013.01); *H04W 36/38* (2013.01); *H04W 36/08* (2013.01)

(56) References Cited

U.S. PATENT DOCUMENTS

| | | | | |
|---|---|---|---|---|
| 2010/0173626 A1* | 7/2010 | Catovic | ............... | H04W 76/027 455/423 |
| 2011/0051687 A1* | 3/2011 | Nakasato | ............... | H04W 36/30 370/331 |
| 2011/0136514 A1* | 6/2011 | Ge | ................... | H04M 1/72572 455/456.6 |
| 2011/0195707 A1* | 8/2011 | Faerber | ................ | H04W 24/08 455/423 |
| 2012/0122456 A1* | 5/2012 | Gao | ................... | H04W 36/245 455/436 |
| 2012/0127876 A1* | 5/2012 | Hunukumbure | ...... | H04W 24/00 370/252 |
| 2013/0084884 A1* | 4/2013 | Teyeb | ................... | H04W 48/04 455/456.1 |
| 2013/0084910 A1* | 4/2013 | Suzuki | ................. | H04W 24/02 455/515 |
| 2013/0115949 A1* | 5/2013 | Centonza | ............ | H04W 36/245 455/436 |
| 2013/0210443 A1* | 8/2013 | Pedersen | ........... | H04W 36/0061 455/441 |
| 2014/0064247 A1* | 3/2014 | Teyeb | ............... | H04W 36/0083 370/331 |
| 2014/0066074 A1* | 3/2014 | Folke | .................... | H04W 36/08 455/437 |
| 2014/0148174 A1* | 5/2014 | Teyeb | ................ | H04W 36/0083 455/441 |
| 2014/0160976 A1* | 6/2014 | Dimou | ................. | H04W 76/02 370/252 |
| 2014/0206360 A1* | 7/2014 | Wegmann | ......... | H04W 36/0083 455/440 |

OTHER PUBLICATIONS

International Search Report issued in corresponding International Patent Application No. PCT/KR2013/000711 dated Apr. 25, 2013.

* cited by examiner

METHOD AND APPARATUS FOR TRANSMITTING HANDOVER REPORT MESSAGE IN WIRELESS COMMUNICATION SYSTEM

BACKGROUND OF THE INVENTION

Field of the Invention

The present invention relates to wireless communication, and more particularly, to a method and apparatus for transmitting a handover report message in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Figure 1:
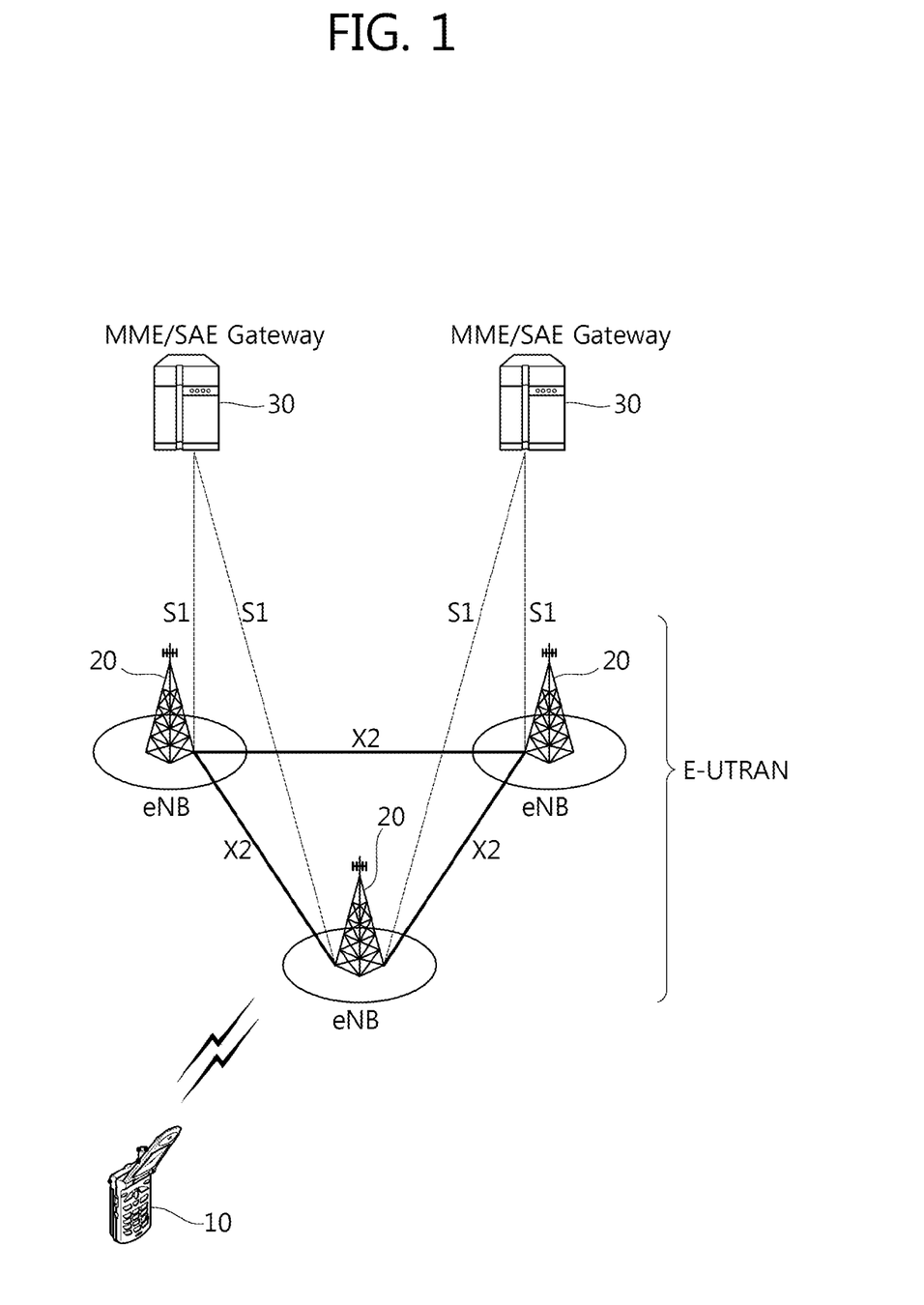
FIG. 1 shows network structure of an evolved universal mobile telecommunication system (E-UMTS).

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data. As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
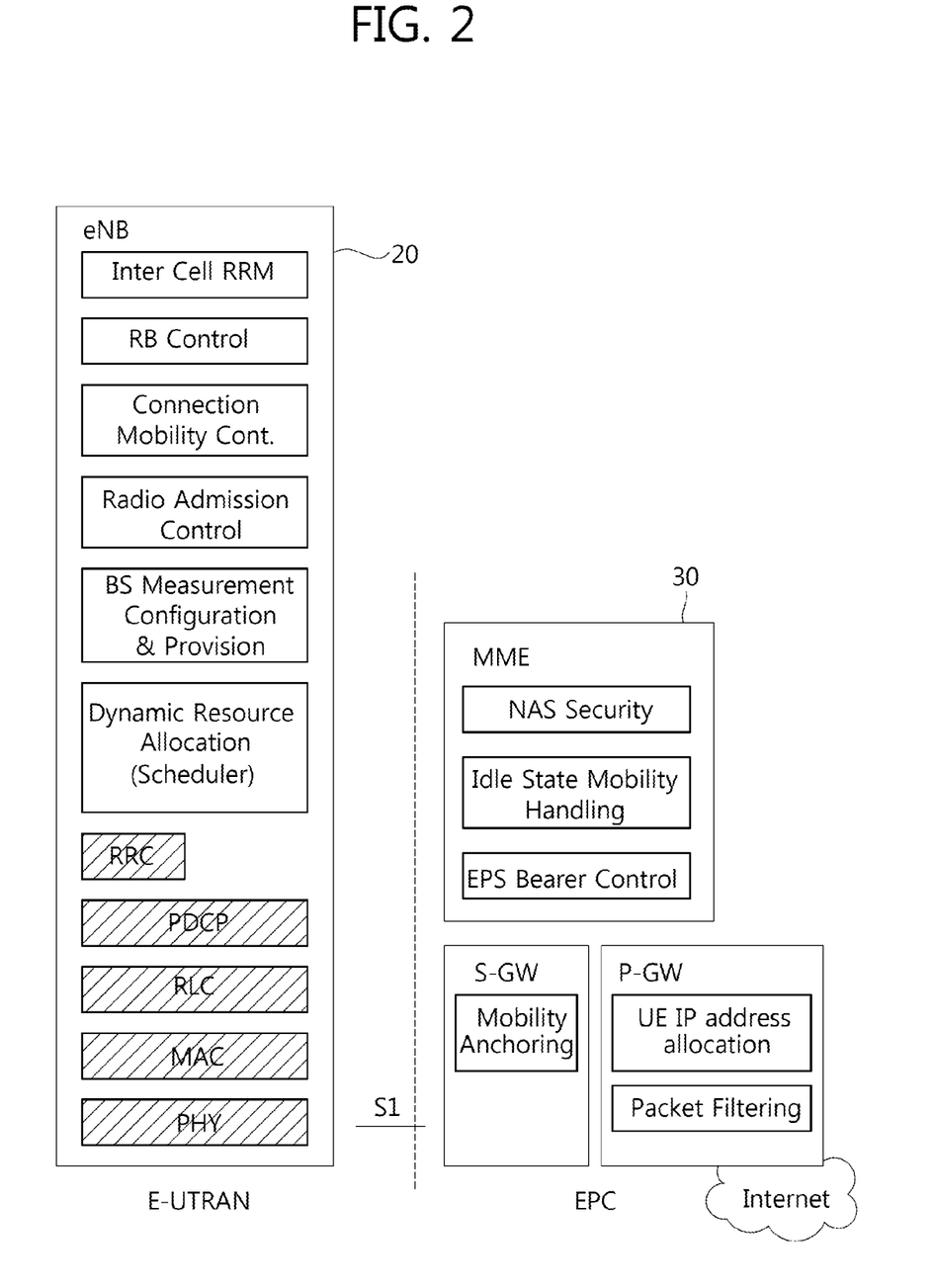
FIG. 2 shows architecture of a typical E-UTRAN and a typical EPC.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
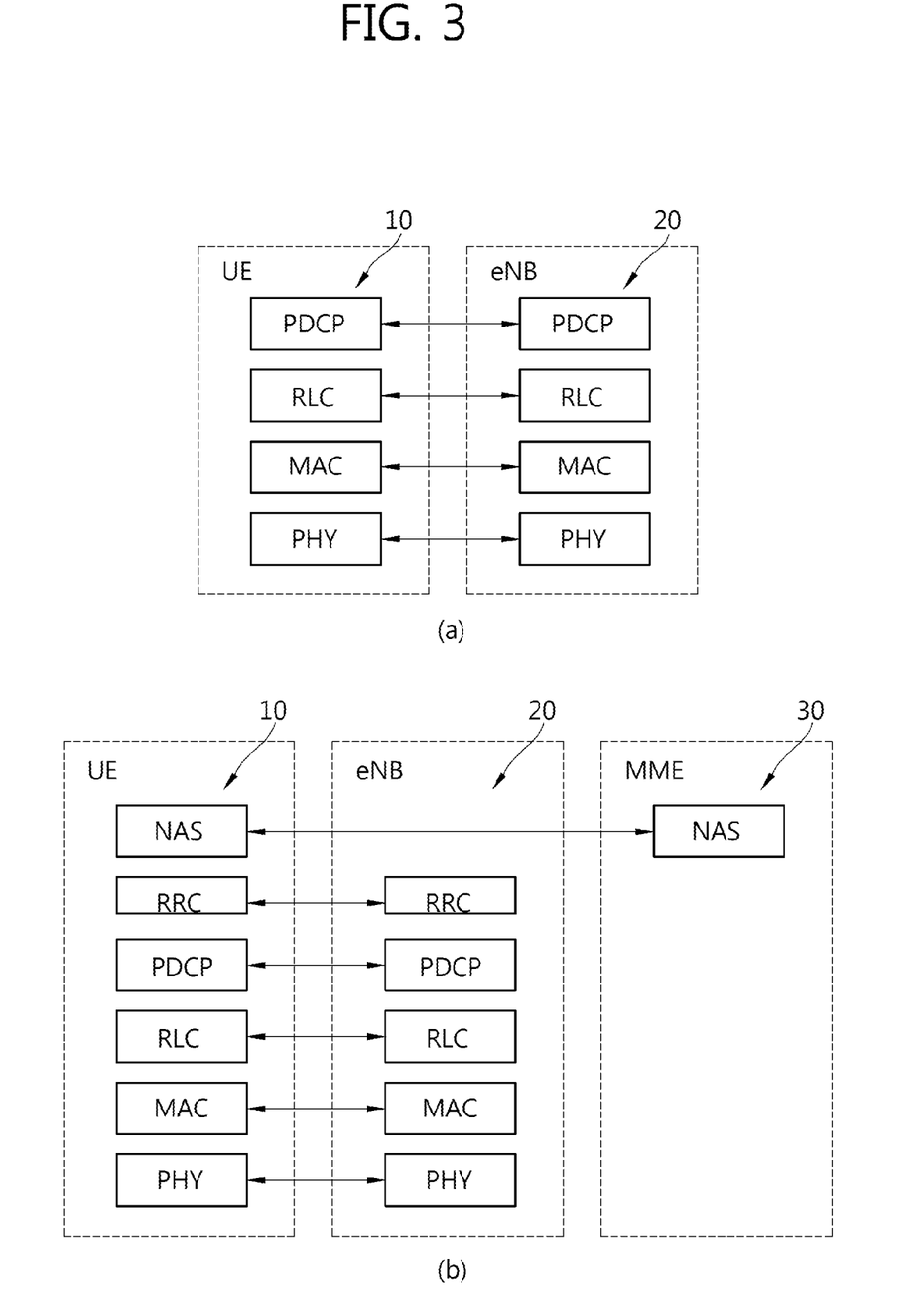
FIG. 3 shows a user-plane protocol and a control-plane protocol stack for the E-UMTS.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARQ). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE 10 monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

Figure 4:
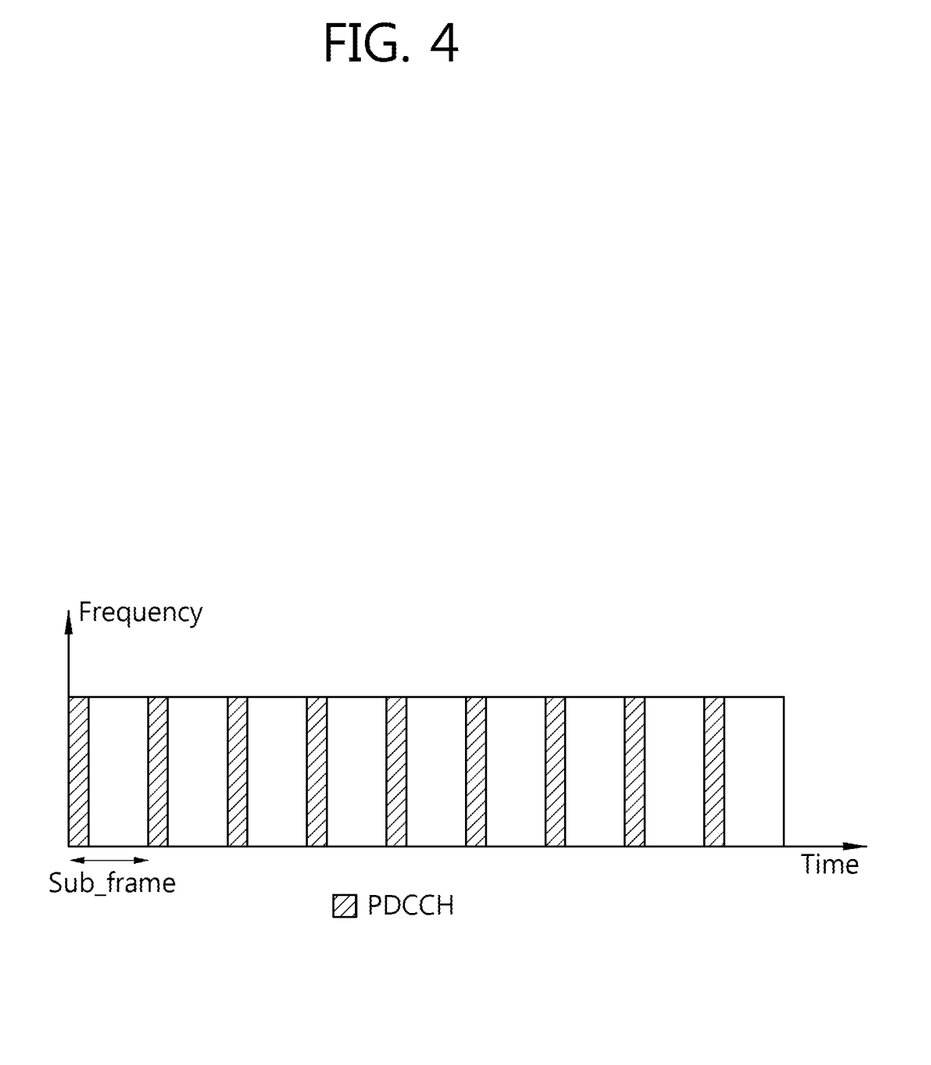
FIG. 4 shows an example of structure of a physical channel.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

In intra and inter frequency and inter radio access technology (RAT) mobility, a mobility failure case consists of a handover subject to failure either within the same RAT or between different RATs or a failure followed by a reconnection in another cell either within the same RAT or in a different RAT. Specifically, some examples of mobility failure may occur during mobility in a heterogeneous network (HetNet). It may be referred to as 'HetNet intra LTE failure cases'.

A method for solving the HetNet intra LTE failure cases is required.

SUMMARY OF THE INVENTION

The present invention provides a method and apparatus for transmitting a handover report message in a wireless communication system. The present invention provides a method for transmitting user equipment (UE) history information element (IE) by including in the handover report message.

In an aspect, a method for transmitting, by a first eNodeB (eNB), a handover report message in a wireless communication system is provided. The method includes performing a handover procedure for a user equipment (UE) with a source eNB, receiving a radio link failure (RLF) indication message, and transmitting a handover report message to the source eNB, the handover report message including UE history information element (IE) of the UE, the UE history information including at least one of identifier (ID), size and stayed time of the cells the UE has passed.

In another aspect, a method for receiving, by a source eNodeB (eNB), a handover report message in a wireless communication system is provided. The method includes performing a handover procedure for a user equipment (UE) with a target eNB, and receiving a handover report message from the target eNB, the handover report message including UE history information element (IE) of the UE, the UE history information including at least one of identifier (ID), size and stayed time of the cells the UE has passed.

A HetNet intra LTE failure cases can be avoided.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 5:
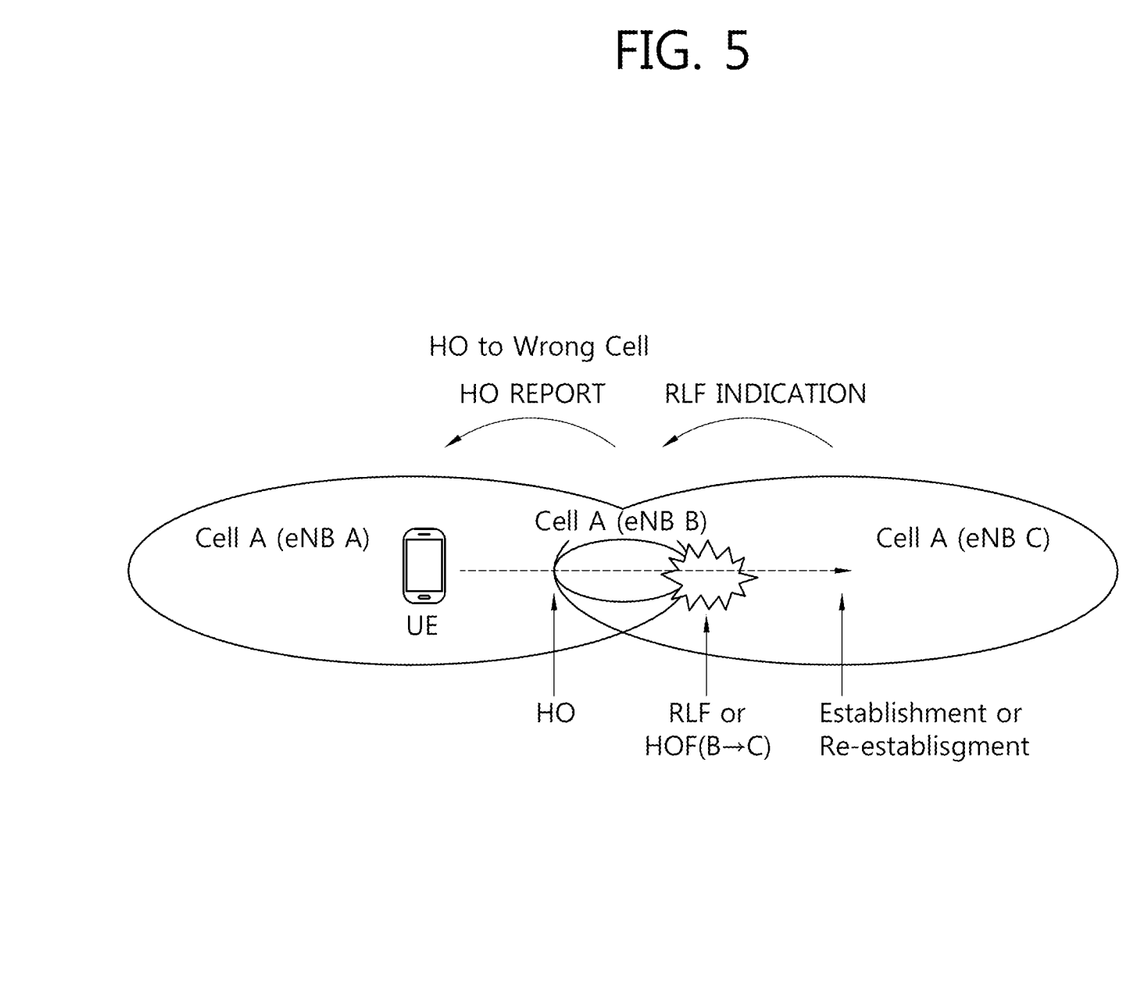
FIG. 5 shows an example of HetNet intra LTE failure cases.

FIG. 5 shows an example of HetNet intra LTE failure cases.

Referring to FIG. 5, a UE is moving from cell A to cell B to cell C with high speed. The UE prepares a handover procedure from the cell A to the cell B. However, after the handover preparation to the cell B and due to high speed mobility, the UE may fail connection to the cell B (e.g., fail RACH access or fail RRC connection/reconfiguration/complete) and successfully reestablish connection to the cell C. Or, the UE may succeed in connecting to the cell B, but shortly after the UE may be subject to radio link failure (RLF) and reestablish connection to the cell C. An eNB C serving the cell C may transmit a RLF indication message to an eNB B serving the cell B. The eNB B may transmit a handover report message to an eNB A serving the cell A. The handover report message may indicate that the UE performs the handover procedure to a wrong cell (cell B). That is, the HetNet intra LTE failure occurs when the UE is moving among three cells.

Figure 6:
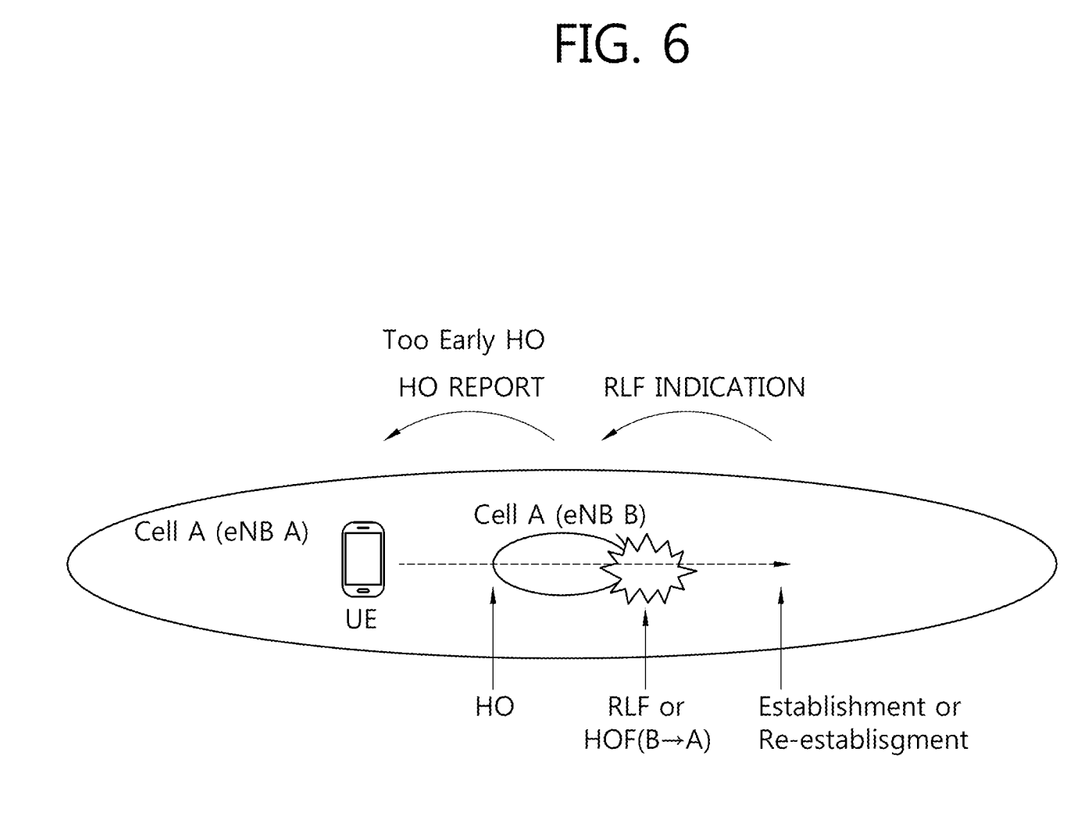
FIG. 6 shows another example of HetNet intra LTE failure cases.

FIG. 6 shows another example of HetNet intra LTE failure cases.

Referring to FIG. 6, a UE is moving from cell A to cell B, and to cell A again with high speed. The UE prepares a handover procedure from the cell A to the cell B. However, after the handover preparation to the cell B and due to high speed mobility, the UE may fail connection to the cell B (e.g., fail RACH access or fail RRC connection/reconfiguration/complete). Or, the UE may succeed in connecting to the cell B, but shortly after the UE may be subject to radio link failure (RLF). The UE reappears in the cell A after the RLF. An eNB A serving the cell A may transmit a RLF indication message to an eNB B serving the cell B. The eNB B may transmit a handover report message to the eNB A. The handover report message may indicate that the UE performs the handover procedure too early. That is, the HetNet intra LTE failure occurs in ping-pong movement situation of the UE between two cells.

To solve the HetNet intra LTE failure cases, it would be beneficial to propagate UE measurements collected during mobility failure to all the nodes involved in the failure. For example, a method of newly defining UE RLF report container information element (IE), and transmitting the UE RLF report container IE included in the handover report message may be proposed. The RLF report container IE may include UE speed information. The UE speed information is useful to apply adaptive handover policies to UEs which have different moving speed. However, HorizontalVelocity field in the UE RLF report container IE, which is one of the UE speed information and indicates horizontal velocity of the UE, depends on the information from global positioning system (GPS) signals currently. Therefore, the method using the UE RLF report container IE in the handover report message requires the assumption that GPS detectors of UEs need to be always on only for the mobility robust optimization (MRO). It would make the battery life time of the UE decrease. That is, a method of providing the UE speed information directly to all the nodes involved in the failure does not seem to be efficient. IF the GPS detectors of UEs are not assumed to be always on, the Horizontal Velocity field is not the value which is always available. In addition, the UE RLF report container IE may contain unnecessary information.

In order to avoid battery waste by a method of transmitting the UE RLF report container IE included in the handover report message, a method of transmitting UE history IE included in the handover report message may be proposed in order to improve MRO performance in HetNet intra LTE failure cases. The UE history IE may contain at least one of identifier (ID), size and stayed time of the cells UE has passed. By counting the number of handovers for the specific duration, it is possible to get the approximate UE speed. The rough information about UE speed would be enough to apply adaptive handover policies to different speed UEs. Similarly, for idle UE, the number of cell reselections for the specific duration is currently used to get the rough UE speed information (normal, medium, high). Moreover, if the UE history IE is included in the handover report message, source eNB (eNB A) can recover the UE history and transfer it to the next handover target eNB in case of HetNet intra LTE failure described in FIG. 6.

Figure 7:
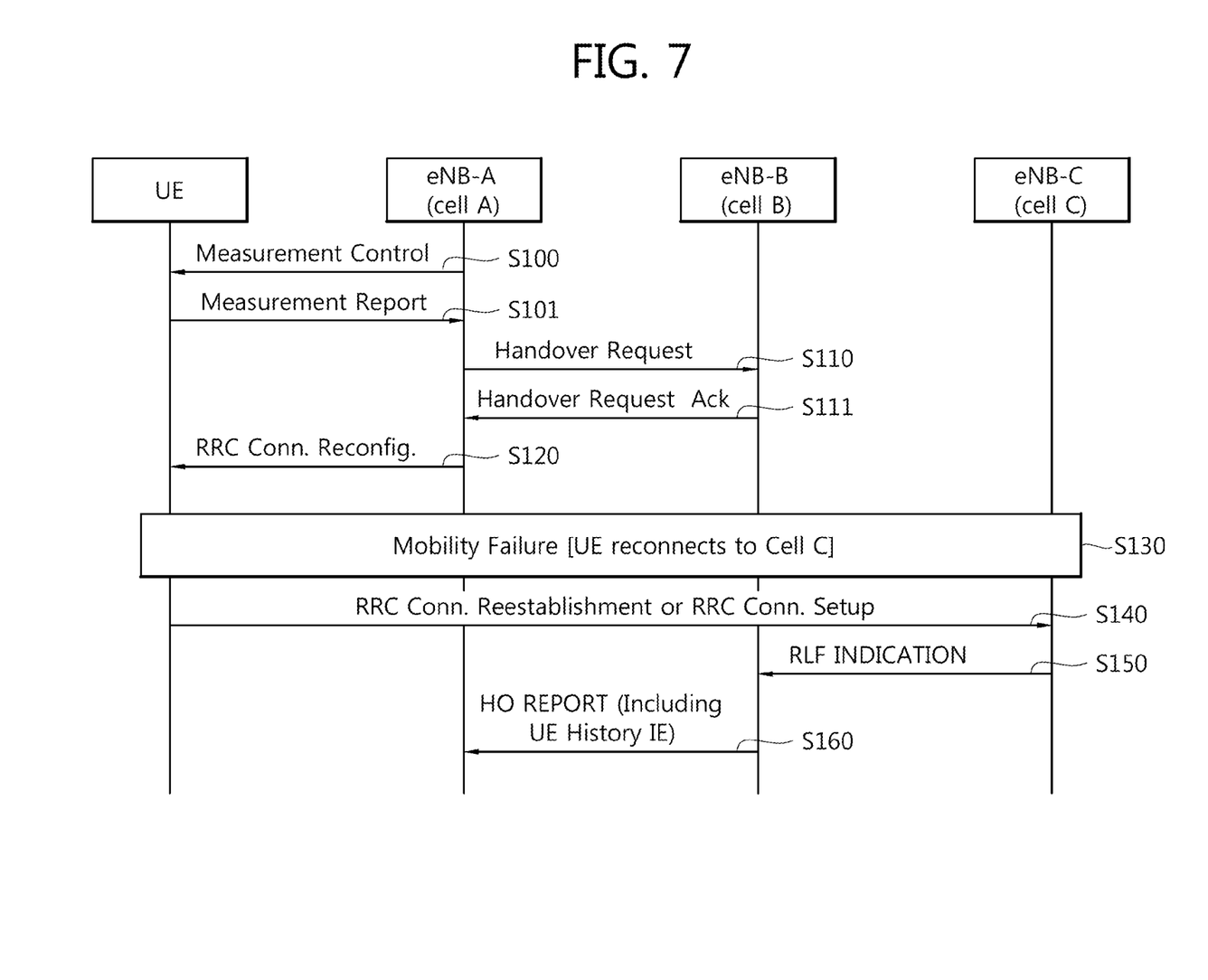
FIG. 7 shows an example of a method for transmitting a handover report message according to an embodiment of the present invention.

FIG. 7 shows an example of a method for transmitting a handover report message according to an embodiment of the present invention. FIG. 7 shows an example of a method for transmitting a handover report message in case that the HetNet intra LTE failure occurs when the UE is moving among three cells.

At step S100, an eNB A transmits a measurement control message to a UE. At step S101, the UE transmits a measurement report message to the eNB A. At step S110, the eNB A transmits a handover request message to an eNB B. At step S111, the eNB B transmits a handover request acknowledgement message to the eNB A. At step S120, the eNB A transmits an RRC connection reconfiguration message to the UE.

At step S130, a mobility failure occurs, and the UE reconnects to a cell C. At step S140, the UE transmits an RRC connection reestablishment message or an RRC connection setup message to an eNB C. At step S150, the eNB C transmits an RLF indication message to the eNB B.

At step S160, the eNB B transmits a handover report message including UE history IE to the eNB A in order to provided UE speed information to the eNB A. The UE speed information may be obtained from the UE history IE. The eNB A may deduce that the mobility failure was due to a high speed UE attempting to perform handover to the cell B. The eNB A may update handover parameters for slow, normal and fast UEs, and may apply adaptive handover policies to different speed UEs based on the UE speed information. Therefore, the eNB A may exclude the cell B as a target cell for future handovers involving high speed moving UE, and prioritize the cell C as a handover target.

As, the UE history IE is always available, the GPS detectors of UEs need not to be always on. Accordingly, the battery life time of the UE can be maintained. Even if the UE history IE does not provide accurate speed of the UE than the UE RLF report container IE, approximate UE speed, which is obtained from the UE history IE, would be enough to apply adaptive handover policies to different speed UEs. Moreover, at the moment of handover decision, the eNB A cannot use the Horizontal Velocity field of the current UE. Accordingly, there is an advantage for using the UE history IE.

Figure 8:
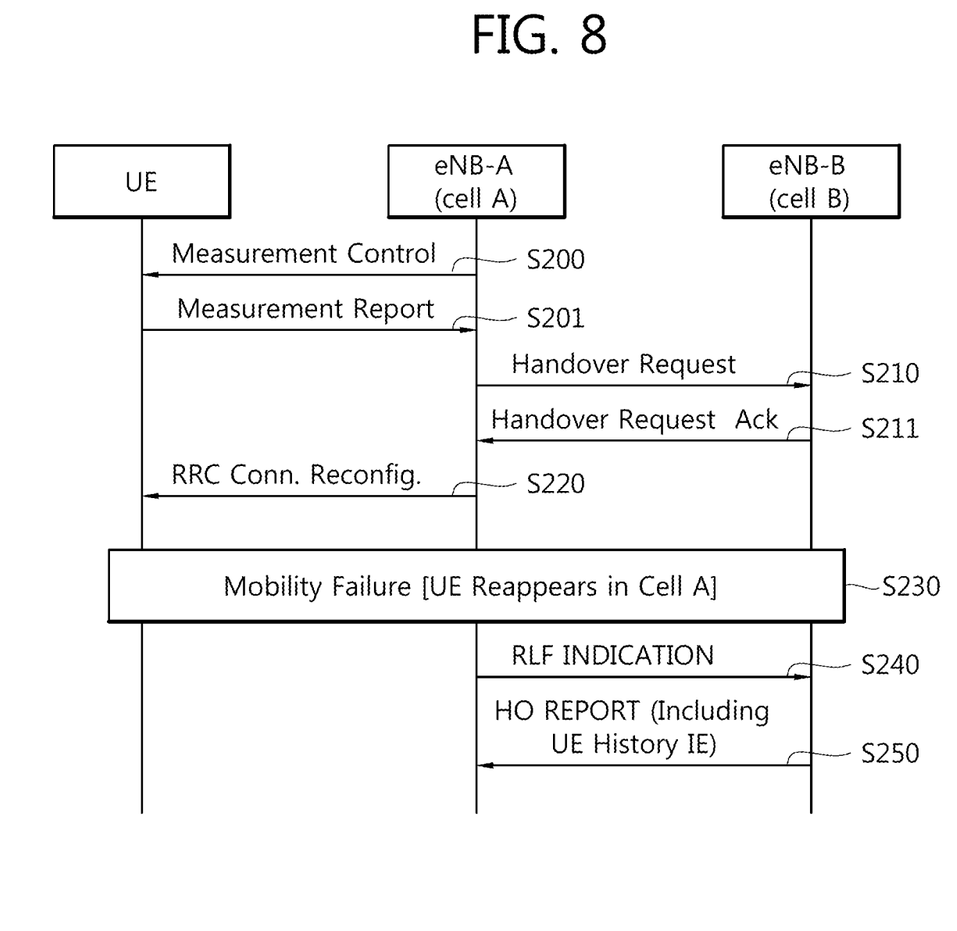
FIG. 8 shows another example of a method for transmitting a handover report message according to an embodiment of the present invention.

FIG. 8 shows another example of a method for transmitting a handover report message according to an embodiment of the present invention. FIG. 8 shows an example of a method for transmitting a handover report message in case that the HetNet intra LTE failure occurs in ping-pong movement situation of the UE between two cells.

At step S200, an eNB A transmits a measurement control message to a UE. At step S201, the UE transmits a measurement report message to the eNB A. At step S210, the eNB A transmits a handover request message to an eNB B. At step S211, the eNB B transmits a handover request acknowledgement message to the eNB A. At step S220, the eNB A transmits an RRC connection reconfiguration message to the UE.

At step S230, a mobility failure occurs, and the UE reappears in a cell A. At step S240, the eNB A transmits an RLF indication message to the eNB B.

At step S250, the eNB B transmits a handover report message including UE history IE to the eNB A in order to provided UE speed information to the eNB A. The UE speed information may be obtained from the UE history IE. The eNB A may deduce that the mobility failure was due to a high speed UE attempting to perform handover to the cell B. The eNB A may update handover parameters for slow, normal and fast UEs, and may apply adaptive handover policies to different speed UEs based on the UE speed information. Therefore, the eNB A may use the UE history IE to recover the UE history and transfer it to a next handover target eNB in too early handover case.

As, the UE history IE is always available, the GPS detectors of UEs need not to be always on. Accordingly, the battery life time of the UE can be maintained. Even if the UE history IE does not provide accurate speed of the UE than the UE RLF report container IE, approximate UE speed, which is obtained from the UE history IE, would be enough to apply adaptive handover policies to different speed UEs. Moreover, at the moment of handover decision, the eNB A cannot use the Horizontal Velocity field of the current UE. Accordingly, there is an advantage for using the UE history IE.

The eNB receiving the handover report message containing the UE history information and concerning the mobility failure may avoid future failures or may filter out potential target cells during the process of deciding the best handover target (e.g. if UEs moving at high speed fail during mobility towards a small cell, that cell could be ignored as a target, if possible, during similar future mobility cases).

Figure 9:
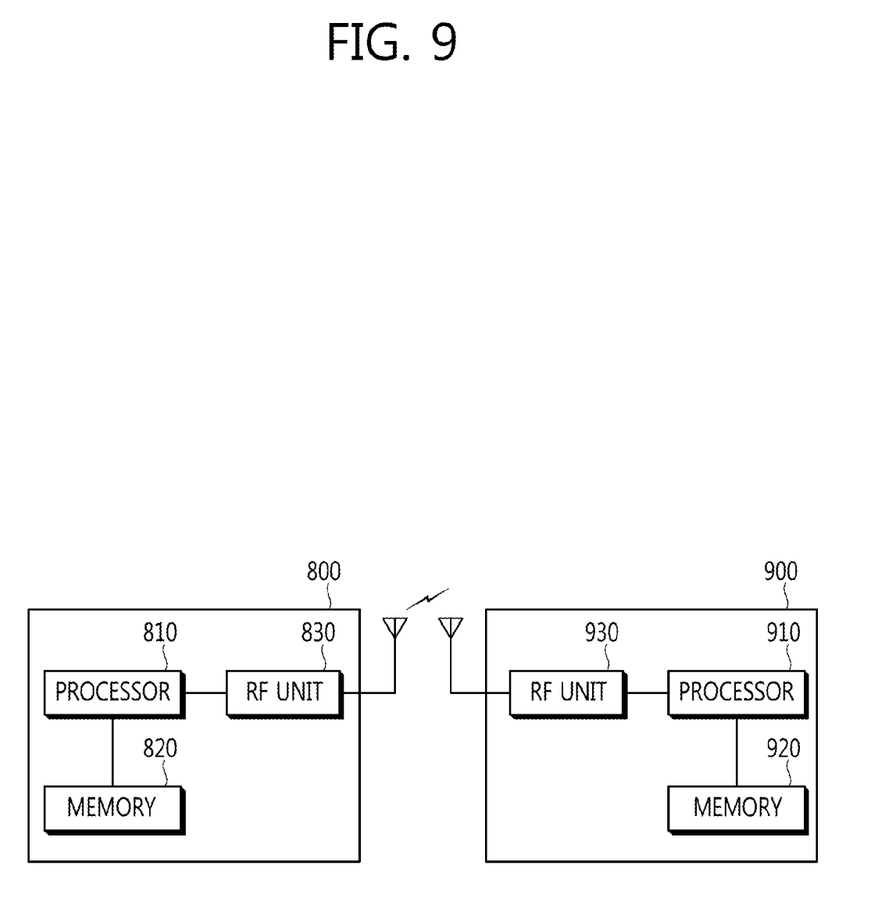
FIG. 9 is a block diagram showing wireless communication system to implement an embodiment of the present invention.

FIG. 9 is a block diagram showing wireless communication system to implement an embodiment of the present invention.

A first eNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a first eNodeB (eNB), a handover report message in a wireless communication system, the method comprising:
   performing a handover procedure for a user equipment (UE) with a source eNB;
   receiving a radio link failure (RLF) indication message;
   transmitting a handover report message, including at least one of a UE RLF report container information element (IE) or a UE history IE of the UE, to the source eNB,
   wherein the UE RLF report container IE includes a Horizontal Velocity field indicating a horizontal velocity of the UE, and
   wherein the UE history IE includes:
     an identifier (ID) of a cell where the UE has passed,
     a size of the cell where the UE has passed, and
     a stayed time of the cell where the UE has passed;
   if the handover report message includes the UE RLF report container IE including the Horizontal Velocity field indicating the horizontal velocity of the UE, a speed of the UE is obtained from the Horizontal Velocity field by the source eNB, and
   if the handover report message does not include the UE RLF report container IE including the Horizontal Velocity field indicating the horizontal velocity of the UE, and if the handover report message includes the UE history IE of the UE, the speed of the UE is calculated by the source eNB by using the ID of the cell where the UE has passed, the size of the cell where the UE has passed, and the stayed time of the cell where the UE has passed which are included in the UE history IE.

2. The method of claim 1, wherein the RLF indication message is received from a second eNB.

3. The method of claim 2, wherein the UE is moving from the source eNB to the first eNB, and then is moving from the first eNB to the second eNB.

4. The method of claim 1, wherein the RLF indication message is received from the source eNB.

5. The method of claim 4, wherein the UE is moving from the source eNB to the first eNB, and then is moving from the first eNB to the source eNB.

6. The method of claim 4, wherein a coverage of a cell served by the source eNB includes a coverage of a cell served by the first eNB.

7. A method for receiving, by a source eNodeB (eNB), a handover report message in a wireless communication system, the method comprising:
   performing a handover procedure for a user equipment (UE) with a target eNB;
   receiving a handover report message, including at least one of a UE RLF report container information element (IE) or a UE history IE of the UE, from the target eNB,
   wherein the UE RLF report container IE includes a Horizontal Velocity field indicating a horizontal velocity of the UE, and
   wherein the UE history IE includes:
     an identifier (ID) of a cell where the UE has passed,
     a size of the cell where the UE has passed, and
     a stayed time of the cell where the UE has passed;
   if the handover report message includes the UE RLF report container IE including the Horizontal Velocity field indicating the horizontal velocity of the UE, a speed of the UE is obtained from the Horizontal Velocity field by the source eNB, and
   if the handover report message does not include the UE RLF report container IE including the Horizontal Velocity field indicating the horizontal velocity of the UE, and if the handover report message includes the UE history IE of the UE, the speed of the UE is calculated by the source eNB by using the ID of the cell where the UE has passed, the size of the cell where the UE has passed, and the stayed time of the cell where the UE has passed which are included in the UE history IE.

8. The method of claim 7, further comprising updating handover parameters for different speed UEs.

9. The method of claim 7, wherein the UE is moving from the source eNB to the target eNB, and then is moving from the target eNB to a first eNB.

10. The method of claim 7, wherein the RLF indication message is received from the source eNB.

11. The method of claim 10, further comprising transmitting an RLF indication message to the target eNB.

12. The method of claim 10, wherein a coverage of a cell served by the source eNB includes a coverage of a cell served by the target eNB.

* * * * *